United States Patent [19]

Maerz et al.

[11] Patent Number: 4,859,167
[45] Date of Patent: Aug. 22, 1989

[54] SNOWBALL MAKER

[76] Inventors: Ralph R. Maerz; Judy A. Maerz, both of P.O. Box 466,, Entwistle, Alberta, Canada, T0E 0S0

[21] Appl. No.: 190,133

[22] Filed: May 4, 1988

[51] Int. Cl.$^4$ .................. B29C 33/26; B29C 43/04
[52] U.S. Cl. ........................... 425/276; 425/318
[58] Field of Search ............ 425/276, 282, 283, 278, 425/279, 281, 218, 221, 408, 318, 277

[56] References Cited

U.S. PATENT DOCUMENTS

| | | | |
|---|---|---|---|
| 1,045,166 | 11/1912 | Murray | 425/283 |
| 1,057,065 | 2/1913 | Krist | 425/283 |
| 1,418,882 | 8/1923 | May | 425/276 |
| 1,584,757 | 5/1926 | Dow | 425/278 |
| 2,164,429 | 7/1939 | Ritter | 425/283 |
| 2,165,941 | 7/1939 | Price | 425/278 |
| 3,289,246 | 12/1966 | Deye | 425/276 |
| 3,836,308 | 9/1974 | Upright | 425/318 |
| 4,163,639 | 8/1979 | Stern et al. | 425/318 |

FOREIGN PATENT DOCUMENTS 1119374  9/1982  Canada .
803238  4/1951  Fed. Rep. of Germany ...... 425/276

Primary Examiner—Willard Hoag
Attorney, Agent, or Firm—Davis, Bujold & Streck

[57] ABSTRACT

There is disclosed a snowball maker that makes better snowballs as it limits that volume of snow used in the formation of the snowball and cuts away the excess snow. The snowball maker is comprised of a pair of semi-spherical cups, the cups having bevelled peripheral edges; and a guide adapted to permit rapid movement of the cups between a first position wherein the edges of the cups are in spaced relation and a second position wherein the edges are engaged, the guide having stop means which define the first position and thereby control the volume of snow compressed between the cups.

4 Claims, 2 Drawing Sheets

SNOWBALL MAKER

BACKGROUND OF THE INVENTION

Throwing snowballs is a popular winter past time for children. Forming the snowballs is a task that many younger children have trouble with as it requires a certain degree of strength and manual dexterity. After being involved in snowball throwing for a period of time a child's mittens tend to become covered with snow and his or her fingers as a consequence become cold.

The above mentioned problems are mitigated if the child utilizes an apparatus for making snowballs. A number of snowball making apparatus have been devised. The problem with such devices is that they do not limit the amount of snow used in the formation of the snowball, and do not have any means to dispose of excess snow. The result of such shortcomings is that the snowballs they form generally are oblong in shape, rather than having a more aesthetically pleasing and aerodynamically sound round shape.

SUMMARY OF THE INVENTION

The primary object of the present invention is to provide a snowball maker that makes better snowballs than is possible using prior art devices.

Broadly, the present invention provides a snowball maker which is comprised of a pair of semi-spherical cups, the cups having bevelled peripheral edges; and a guide adapted to permit rapid movement of the cups between a first position wherein the edges of the cups are in spaced relation and a second position wherein the edges are engaged, the guide having stop means which define the first position and thereby control the volume of snow compressed between the cups.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
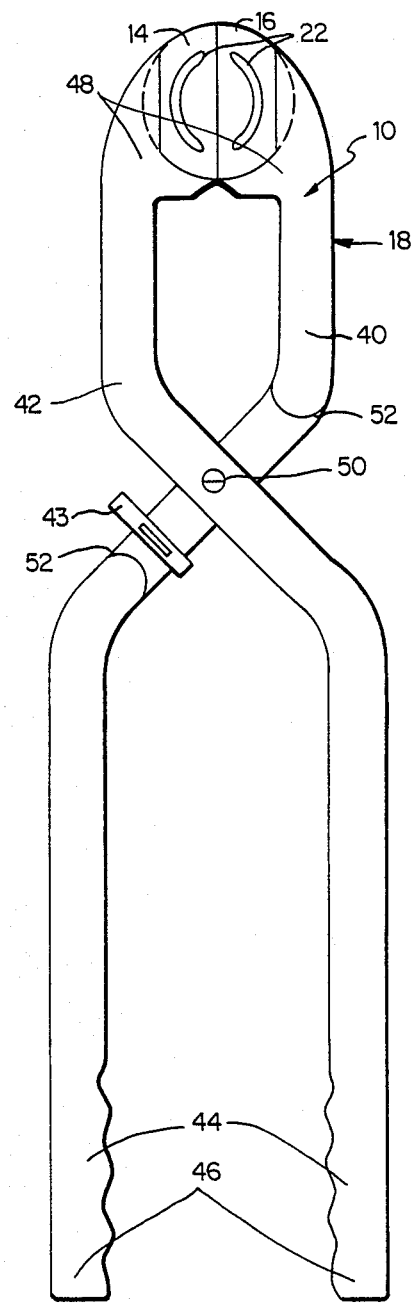
FIG. 1 is a side view of a preferred embodiment of the invention.
Figure 2:
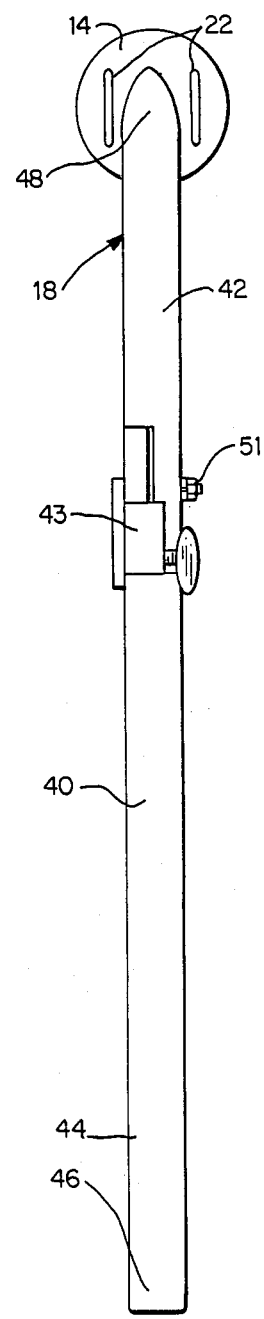
FIG. 2 is an end view of a preferred embodiment of the invention.

The preferred embodiments will now be described with reference to FIGS. 1 through 7. The preferred embodiment illustrated, generally designated by reference numerals 10, is a snowball maker.

Figure 3:
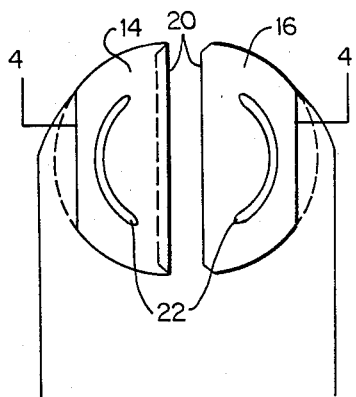
FIG. 3 is a detailed view of a portion of a preferred embodiment of the invention.
Figure 4:
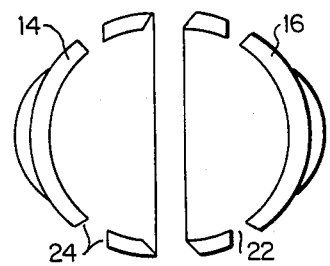
FIG. 4 is a section view of a portion of a preferred embodiment of the invention, taken along section lines 4—4 of FIG. 3.
Figure 5:
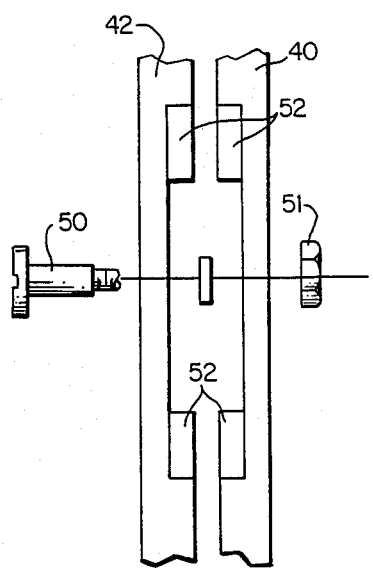
FIG. 5 is an exploded detail view of a portion of a preferred embodiment of the invention.

Snowball maker 10 has a pair of semi-spherical cups 14 and 16 and a guide 18. Both of the cups have a bevelled peripheral edges 20. As best illustrated in FIGS. 3 and 4, cup 14 has slots 22 with bevelled edges 24 which permit the exit of excess snow. Guide 18 permits the rapid movement of the cups between a first position where the edges of the cups are in spaced relation and a second position where the edges are engaged. There are prior art devices which use cups to form snowballs. A problem with prior art devices is that an accumulation of excess snow causes the snowballs to be oblong. Some of these devices even have protruding flanges or mating lips which aggravate excess snow accumulation by providing a surface between which show is compressed. The problem of snow accumulation is reduced if the cups are brought rapidly together. This is, of course, not possible in the absence of a guide. The problem can be further reduced by having a streamline profile on the cups such as bevelled edges 20 thereby eliminating any surface which might compress accumulations of snow, and promoting the cutting away of excess snow. The problem can further be reduced by creating an opening, such as slots 22 through which excess snow may exit.

Figure 6:
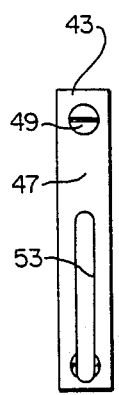
FIG. 6 is an end view of a portion of a preferred embodiment of the invention.
Figure 7:
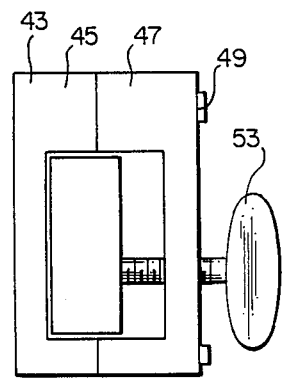
FIG. 7 is a side view of a portion of a preferred embodiment of the invention.

Snowball maker 10, as best illustrated in FIG. 1, has a guide 18 which consists of a pair of pivotally attached ogee shaped scissor members 40 and 42. The ogee shape of members 40 and 42 permits a stop to be placed on one of the members either as a permanently fixed shoulder or as a movable clamping member as will be hereinafter described. Handles 44 are mounted at end 46 of the members. Cups 14 and 16 are mounted to the other end 48 of members 40 and 42. Members 40 and 42 pivot about pivot point formed by bolt 50 and nut 51. On member 40 is placed a clamp 43 which is positioned adjacent pivot point 50 toward end 46. Clamp 43, which is best illustrated in FIGS. 6 and 7, is intended to limit the relative movement of the scissor members and defines the first position previously referred to. The first position could otherwise be defined by shoulders 52, if shoulders 52 were positioned to ensure the volume of snow taken into cups 14 and 16 would produce a round snowball without excess snow. Shoulders 52 would not be adjustable, however, and for that reason clamp 43 is preferred. Clamp 43 consists of two sections 45 and 47 which are placed around member 40 and fastened together by screws 49. A thumb screw 53 goes through section 47 and serves to clamp member 40 in a preselected position against section 45 forming an obstruction which limits the range of pivotal movement of members 40 and 42.

When using snowball maker 10, the user grasps the snowball maker by handles 44 and moves them radially outward until their movement is stopped by clamp 43 which limits the respective movement of members 40 and 42 thereby defining a first position. (Alternately, the first position can be defined by shoulders 52.) End 48 of scissor members 40 and 42 upon which cups 14 and 16 are mounted is then inserted into a snowbank. As handles 44 are drawn rapidly together cups 14 and 16 are forced together compressing the snow therebetween. The rapid motion of cups 14 and 16 causes them to cut through the snow. As edge 20 is bevelled snow does not become compressed against and build up on the peripheral edge of the cups. Should the snow contain ice crystals which adversely affects the ability of cups 14 and 16 to compress the volume of snow obtained by the movement of the cups from the first position the present invention can be adapted to accommodate the change in snow conditions. The user can turn thumb screw 53 to release member 40, thereby permitting the clamp 43 to be moved axially along member 40. This adjustment changes the range of movement of members 40 and 42, and consequently the volume of snow collected in cups 14 and 16. By experimentation the user can find a positioning for clamp 43 which is optimum for the snow conditions. As long as the adjustment is reasonably close to the volume of show required, excess snow will be squeezed out of slots 22. Upon the separating of handles 44, cups 14 and 16 similarly separate giving access to a snowball, which will be closer to a round snowball than is possible with any prior art device.

It will be apparent to one skilled in the art that modifications may be made to the structure of guides 18 without departing from the teachings of the present invention. It will further be apparent that following the teachings of the present invention resolves problems present in the prior art relating to oblong snowballs being produced as a result of excess snow build up between the cups.

The embodiments of the invention in which an exclusive property or privilege is claimed are defined as follows:

1. A snowball maker, comprising:
   a. a pair of semi-spherical cups, said cups having bevelled peripheral edges;
   b. a guide adapted to permit rapid movement of said cups between a first position wherein said edges of said cups are in spaced relation and a second position wherein said edges are engaged, said guide having stop means which define said first position and thereby control the volume of snow compressed between said cups;
   c. at least one of said cups defining slots for permitting exit of excess show;
   d. edges defining said slot being bevelled.

2. A snowball maker as defined in claim 1, said guide being a pair of pivotally attached ogee shaped scisor members having handles mounted on one end and said cups mounted on the remote end, at least one of said members having a stop adjacent said pivot toward said handle end of said member limiting relative movement of said members to define said first position and thereby control the volume of snow compressed between said cups.

3. A snowball maker as defined in claim 2, said stop being a clamp attached to one of said members which limits relative movement of said members, said clamp being axially moveable along said member whereby the volume of snow compressed between said cups may be adjusted.

4. A snowball maker, comprising:
   (a) a pair of semi-spherical cups, said cups having bevelled peripheral edges;
   (b) a guide adapted to permit rapid movement of said cups between a first position wherein said edges of said cups are in spaced relation and a second position wherein said edges are engaged, said guide having stop means which define said first position and thereby control the volume of snow compressed between said cups;
   (c) said guide being a pair of pivotally attached ogee shaped scissor members having handles mounted on one end and said cups mounted on the remote end, at least one of said members having a stop adjacent said pivot toward said handle end of said member limiting relative movement of said members to define said first position and thereby control the volume of snow compressed between said cups;
   (d) said stop being a clamp attached to one of said members which limits relative movement of said members, said clamp being axially moveable along said member whereby the volume of snow compressed between said cups may be adjusted.

* * * * *

UNITED STATES PATENT AND TRADEMARK OFFICE
CERTIFICATE OF CORRECTION

PATENT NO. : 4,859,167

DATED : August 22, 1989

INVENTOR(S) : Ralph Ronald MAERZ & Judy Arlene MAERZ

It is certified that error appears in the above—identified patent and that said Letters Patent is hereby corrected as shown below:

Column 3, Line 32, - change "show" to "snow"; and

Column 3, Line 35, - change "scisor" to "scissor".

Signed and Sealed this

Twelfth Day of June, 1990

*Attest:*

HARRY F. MANBECK, JR.

*Attesting Officer*     *Commissioner of Patents and Trademarks*